US012602113B2

(12) United States Patent
Kristensson et al.

(10) Patent No.: US 12,602,113 B2
(45) Date of Patent: Apr. 14, 2026

(54) COMPUTER A SOFTWARE MODULE ARRANGEMENT, A CIRCUITRY ARRANGEMENT, A USER EQUIPMENT AND A METHOD FOR AN IMPROVED AND EXTENDED USER INTERFACE

(71) Applicant: Telefonaktiebolaget LM Ericsson (publ), Stockholm (SE)

(72) Inventors: Andreas Kristensson, Södra Sandby (SE); Alexander Hunt, Tygelsjö (SE); Fredrik Dahlgren, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 83 days.

(21) Appl. No.: 18/275,959

(22) PCT Filed: Mar. 3, 2021

(86) PCT No.: PCT/EP2021/055343
§ 371 (c)(1),
(2) Date: Aug. 4, 2023

(87) PCT Pub. No.: WO2022/184251
PCT Pub. Date: Sep. 9, 2022

(65) Prior Publication Data
US 2024/0103630 A1      Mar. 28, 2024

(51) Int. Cl.
*G06F 3/01* (2006.01)
*G06F 3/041* (2006.01)
(Continued)

(52) U.S. Cl.
CPC ............ *G06F 3/017* (2013.01); *G06F 3/0412* (2013.01); *G06F 3/042* (2013.01); *G06F 3/044* (2013.01);
(Continued)

(58) Field of Classification Search
CPC ........ G06F 3/017; G06F 3/0412; G06F 3/042; G06F 3/044; G06F 3/0487; G06F 2203/04101; G06F 1/1626; G06F 1/1684
See application file for complete search history.

(56) References Cited

U.S. PATENT DOCUMENTS

| | | | |
|---|---|---|---|
| 10,318,034 B1 | 6/2019 | Hauenstein et al. | |
| 2009/0219255 A1* | 9/2009 | Woolley ................ | G06F 3/0446 345/173 |

(Continued)

FOREIGN PATENT DOCUMENTS

| | | |
|---|---|---|
| CN | 109643217 A | 4/2019 |
| EP | 2979365 | 2/2016 |

(Continued)

OTHER PUBLICATIONS

Final Office Action issued Dec. 18, 2024 in connection with U.S. Appl. No. 18/276,030, 38 pages.
(Continued)

*Primary Examiner* — Cao H Nguyen
(74) *Attorney, Agent, or Firm* — Weisberg I.P. Law, P.A.

(57) ABSTRACT

A user equipment comprising a display, at least one side sensor and a controller, wherein the side sensor configured to receive touchless user input at a side of the display, thereby providing a touchless input area, and wherein the controller is configured to: detect that an object is in the touchless input area; indicate at least one option; detect a movement of the object and act accordingly, wherein when the movement is detected to be towards the user equipment, the controller is configured to act by performing an action associated with the option being displayed at a location corresponding to the object; when the movement is detected to be along the user equipment, the controller is configured to act accordingly by determining a new option corresponding to a new location of the object; when the movement is
(Continued)

detected to be away from the user equipment, the controller is configured to cancel at least one option.

22 Claims, 7 Drawing Sheets

(51) Int. Cl.
| | |
|---|---|
| *G06F 3/042* | (2006.01) |
| *G06F 3/044* | (2006.01) |
| *G06F 3/0487* | (2013.01) |

(52) U.S. Cl.
CPC .. *G06F 3/0487* (2013.01); *G06F 2203/04101* (2013.01)

(56)                References Cited

U.S. PATENT DOCUMENTS

| | | | |
|---|---|---|---|
| 2011/0216075 A1 | 9/2011 | Shigeta et al. | |
| 2012/0032979 A1 | 2/2012 | Blow et al. | |
| 2012/0075202 A1 | 3/2012 | Michaelis | |
| 2013/0257777 A1 | 10/2013 | Benko | |
| 2014/0104160 A1 | 4/2014 | Eriksson et al. | |
| 2014/0104240 A1 | 4/2014 | Eriksson et al. | |
| 2014/0201666 A1 | 7/2014 | Bedikian et al. | |
| 2014/0359504 A1 | 12/2014 | Kim | |
| 2015/0015511 A1 | 1/2015 | Kwak et al. | |
| 2015/0130764 A1 | 5/2015 | Woolley et al. | |
| 2015/0242006 A1 | 8/2015 | Kim | |
| 2015/0277566 A1 | 10/2015 | Musgrave et al. | |
| 2016/0048368 A1 | 2/2016 | McGibney et al. | |
| 2016/0062515 A1 | 3/2016 | Bae | |
| 2016/0098137 A1 | 4/2016 | Kim et al. | |
| 2016/0170505 A1 | 6/2016 | Jordan | |
| 2016/0231807 A1 | 8/2016 | Ogasawara et al. | |
| 2016/0266652 A1* | 9/2016 | Son | G06F 3/0485 |
| 2018/0314362 A1 | 11/2018 | Kim et al. | |
| 2022/0283684 A1* | 9/2022 | Zhang | G06F 3/04847 |
| 2022/0308709 A1* | 9/2022 | Kim | G06F 3/04886 |
| 2023/0146478 A1 | 5/2023 | You | |

FOREIGN PATENT DOCUMENTS

| | | | |
|---|---|---|---|
| JP | 2015510642 A | | 4/2015 |
| JP | 2016148899 A | | 8/2016 |
| JP | 2017162495 A | | 9/2017 |
| JP | 2017526061 | | 9/2017 |
| KR | 1020160129497 A | | 11/2016 |
| WO | 2013168508 A1 | | 11/2013 |
| WO | 2015112405 A1 | | 7/2015 |

OTHER PUBLICATIONS

Non-Final Office Action issued Dec. 31, 2024 in connection with U.S. Appl. No. 18/275,820, 29 pages.

PCT International Search Report, mailed Nov. 29, 2021, in connection with International Application No. PCT/EP2021/055344, all pages.

PCT Written Opinion, mailed Nov. 29, 2021, in connection with International Application No. PCT/EP2021/055344, all pages.

PCT International Search Report, mailed Nov. 29, 2021, in connection with International Application No. PCT/EP2021/055343, all pages.

PCT Written Opinion, mailed Nov. 29, 2021, in connection with International Application No. PCT/EP2021/055343, all pages.

PCT International Search Report, mailed Nov. 24, 2021, in connection with International Application No. PCT/EP2021/055342, all pages.

PCT Written Opinion, mailed Nov. 24, 2021, in connection with International Application No. PCT/EP2021/055342, all pages.

Japanese Office Action, with English language translation, mailed Aug. 16, 2024 in connection with Japanese Application No. 2023-543447, 14 pages.

Non-Final Office Action issued Jul. 17, 2024 in connection with U.S. Appl. No. 18/276,030, 30 pages.

Non-Final Office Action issued Mar. 10, 2025 in connection with U.S. Appl. No. 18/276,030, 36 pages.

Final Office Action issued May 1, 2025 in connection with U.S. Appl. No. 18/275,820, 27 pages.

Indian Office Action dated Aug. 18, 2025 for Application No. 202317057318, consisting of 8 pages.

\* cited by examiner

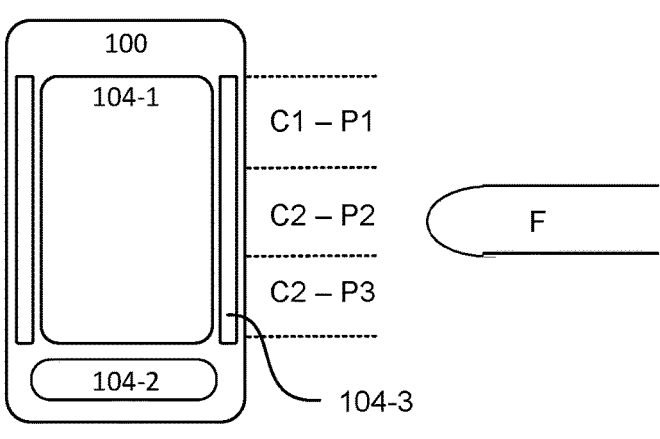
FIG. 1C
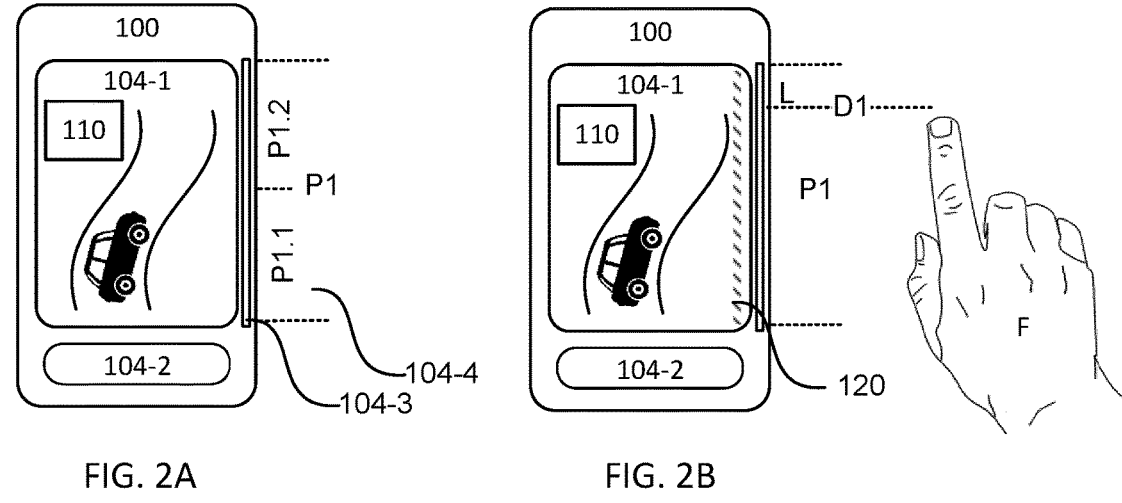
FIG. 2A
FIG. 2B
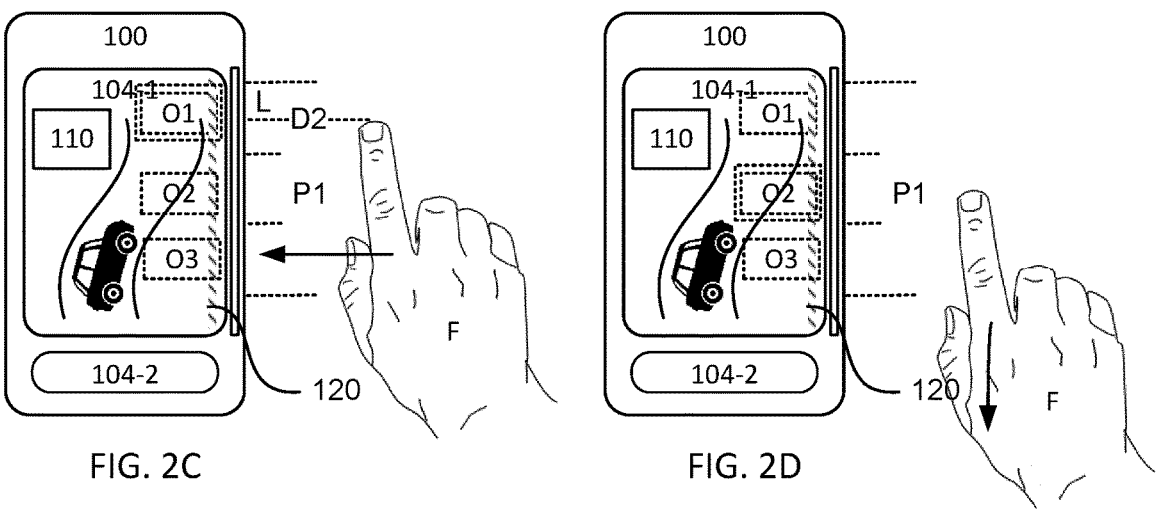
FIG. 2C
FIG. 2D

400

500

COMPUTER A SOFTWARE MODULE ARRANGEMENT, A CIRCUITRY ARRANGEMENT, A USER EQUIPMENT AND A METHOD FOR AN IMPROVED AND EXTENDED USER INTERFACE

TECHNICAL FIELD

The present invention relates to an arrangement, an arrangement comprising computer a software modules, an arrangement comprising circuits, a user equipment and a method for providing an improved and extended user interface, and in particular to an arrangement, an arrangement comprising computer a software modules, an arrangement comprising circuits, a user equipment and a method for providing an improved and extended user interface enabling controlling of background applications.

BACKGROUND

Today's user equipments or mobile devices have touch-screens. These are based on touching the display with one or several fingers, and moving the finger in a certain way can have certain specific meaning, such as touching the screen and moving the finger from the bottom of the screen and upwards on for example an iPhone™ means that the active applications are listed as windows-based icons in the screen that one can as a next step scroll between.

There are sensors added to such mobile devices, e.g. radar that enable gesture recognition or detection of movements in certain parts of the space surrounding the device.

In many applications or navigation scenarios, the touch input is limited by the size of the device display, e.g. scrolling through content that in itself is not related to size of the device display. For example, a smartwatch has a very limited physical size of the display.

In many usage scenarios and for many mobile device applications, the application takes over the complete screen when active, meaning that the area on the touchscreen to potentially control other applications are no longer available, and to be able to control other applications often implies a multi-touch sequence to move to the other application where the current shown application needs to be changed and another application should be selected to be shown on the screen.

There are technologies to identify gestures or movements outside of physical device, e.g. by radar or camera, but these normally are less intuitive from a usage perspective.

SUMMARY

As discussed above, the inventors have realized that as the touchless input area is invisible and as the touchless input area is designed to be used when another application is being active, i.e. takes up most of the display space, it is inherently difficult for a user to realize what controls have which effect. The solution according to the teachings herein enables a user to correlate functions to applications and portions of the touchless input area. Moreover, the solutions provided are simple and elegant, which is inventive in itself.

The invention is based on the combination of selecting and placing user equipment and/or application user interface controls in the nearby space surrounding the user equipment, and have said controls visually indicated by said user equipment and/or application control on the user equipment display, so as to make it easy and natural for the user to interact with selected control in the space surrounding the user equipment.

An object of the present teachings is thus to overcome or at least reduce or mitigate the problems discussed in the above.

According to one aspect a user equipment is provided, the user equipment comprises a display, at least one side sensor and a controller, wherein the side sensor configured to receive touchless user input at a side of the display, thereby providing a touchless input area, and wherein the controller is configured to: detect that an object (F) is in the touchless input area; indicate at least one option; detect a movement of the object (F) and act accordingly, wherein when the movement is detected to be towards the user equipment, the controller is configured to act by performing an action associated with the option being displayed at a location corresponding to the object; when the movement is detected to be along the user equipment, the controller is configured to act accordingly by determining a new option corresponding to a new location of the object (F); when the movement is detected to be away from the user equipment, the controller is configured to cancel at least one option.

This allows for an easy and natural manner for a user to interact with selected controls for a background application (or user equipment controls) in the space surrounding the user equipment without interfering with the active application, i.e. the top application.

The usage of the options does not change the activities of the first or active application that might occupy the complete display and the complete (touch) user interface of the full (touch) display. Furthermore, when the user interacts with applications using the controls or options in the nearby space, i.e the touchless input area, icons or other graphical representations are indicated on the display to provide visual feedback on such control enabling navigation through settings or to select appropriate commands or actions for the application (or user equipment function) controlled by the controls in the nearby space. This is done without any disruption of the first application.

In one embodiment the option is associated with a command the controller is further configured to perform the associated action by executing such command.

In one embodiment the controller is further configured to receive further input regarding the command and then executing based on the further input.

In one embodiment the option is associated with further options, the controller is further configured to perform the associated action by displaying the further options.

In one embodiment wherein the option is associated with an application to be initiated, the controller is further configured to perform the associated action by initiating the application.

In one embodiment wherein when the option is associated with a data object, the controller is further configured to perform the associated action by selecting the data object.

In one such embodiment wherein the data object is associated with command, and the controller is further configured to perform the associated action by executing the command associated with the data object.

In one embodiment the controller is further configured to detect that an object (F) is in the touchless input area by determining that the object (F) is at a distance (D1) falling below a threshold distance.

In one such embodiment the threshold distance is the range of the side sensor(s).

In one embodiment the controller is further configured to determine that the detected object is a finger of a user.

In one embodiment the controller is further configured to indicate that the at least one option is available for selection by indicating the extent of a menu structure.

In one embodiment the controller is further configured to indicate that the at least one option is available for selection by displaying at least one option.

In one embodiment the controller is further configured to determine an option as being a selectable option if the option is displayed at a location corresponding to where the distance to the object falls below the threshold distance.

In one embodiment the controller is further configured to indicate the selectable option.

In one embodiment the controller is further configured to detect that a movement is towards the user equipment when the distance to the object falls below a threshold value.

In one embodiment the further options are further options in a menu structure.

In one embodiment the controller is further configured to configured to display the further options in addition to the options In one embodiment the controller is further configured to display the further options instead of the options In one embodiment the user equipment is a smartphone, smart watch or a tablet computer.

According to one aspect a method for use in a user equipment comprising a display and at least one side sensor configured to receive touchless user input at a side of the display, thereby providing a touchless input area, and wherein the method comprises: detecting that an object (F) is in the touchless input area; indicating at least one option; detecting a movement of the object (F) and acting accordingly, wherein when the movement is detected to be towards the user equipment, act accordingly by performing an action associated with the option being displayed at a location corresponding to the object; when the movement is detected to be along the user equipment, act accordingly by determining a new option corresponding to a new location of the object (F); when the movement is detected to be away from the user equipment, cancelling at least one option.

According to one aspect there is provided a computer-readable medium carrying computer instructions that when loaded into and executed by a controller of a user equipment enables the user equipment to implement any of the methods herein.

According to one aspect there is provided a software module arrangement for a user equipment comprising a display and at least one side sensor configured to receive touchless user input at a side of the display, thereby providing a touchless input area, wherein the a software module arrangement comprises: a software module for detecting that an object (F) is in the touchless input area; a software module for indicating at least one option; a software module for detecting a movement of the object (F) and a software module for acting accordingly, wherein when the movement is detected to be towards the user equipment, act accordingly by performing an action associated with the option being displayed at a location corresponding to the object; when the movement is detected to be along the user equipment, act accordingly by determining a new option corresponding to a new location of the object (F); when the movement is detected to be away from the user equipment, cancelling at least one option.

According to one aspect there is provided an arrangement adapted to be used in a user equipment comprising a display, at least one side sensor configured to receive touchless user input at a side of the display, thereby providing a touchless input area, and said arrangement comprising: circuitry for detecting that an object (F) is in the touchless input area; circuitry for indicating at least one option; circuitry for detecting a movement of the object (F) and circuitry for acting accordingly, wherein when the movement is detected to be towards the user equipment, act accordingly by performing an action associated with the option being displayed at a location corresponding to the object; when the movement is detected to be along the user equipment, act accordingly by determining a new option corresponding to a new location of the object (F); when the movement is detected to be away from the user equipment, cancelling at least one option.

The teachings herein allows for a much larger interaction area than limited by the physical size of the display. The user interface will be intuitive, so that the extended touch area, i.e. the touchless input area, is activated and used as a very natural extension to the physical (touch) display. Device and/or application controls defined to be placed in the virtual space surrounding the device will be clearly indicated by the user equipment on the display. During usage of the virtual controls in the nearby space, a first (active or top) application that occupies most of the display and most of the (touch) user interface is not interrupted, and there is no risk that input to a secondary (or background) application via the virtual control can mistakenly impact the functionality of the first application. Such a risk would be prevalent if the (touch) user interface of the display is suddenly shared between a first application and the secondary application. The only disturbance to the first applications is the temporarily visible, but transparent, icons for the secondary application, but these can be semi-transparent, small, and will not react to touch on the display. The disturbance is thus only minimal.

Overall, the proposed invention allows for active use and control of a secondary application (e.g. music player, social media likes, automatic chat replies or similar) while a first application can use the complete (or most of the) display without disruption.

The solution may be implemented as a software solution, a hardware solution or a mix of software and hardware components. Further embodiments and advantages of the present invention will be given in the detailed description.

BRIEF DESCRIPTION OF THE DRAWINGS

Embodiments of the invention will be described in the following, reference being made to the appended drawings which illustrate non-limiting examples of how the inventive concept can be reduced into practice.

FIG. 1C shows the user equipment of FIG. 1A, where different commands have been assigned to different portions of a touchless input area of the user equipment according to an embodiment of the present invention;

FIG. 2A shows a schematic view of a user equipment according to an embodiment of the present invention;

FIG. 2B shows a schematic view of a user equipment according to an embodiment of the present invention;

FIG. 2C shows a schematic view of a user equipment according to an embodiment of the present invention;

FIG. 2D shows a schematic view of a user equipment according to an embodiment of the present invention;

DETAILED DESCRIPTION

Figure 1A:
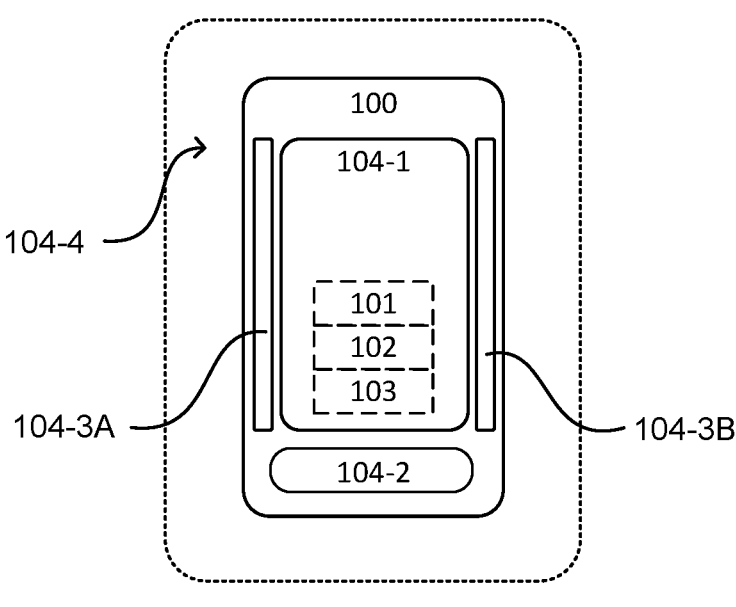
FIG. 1A shows a schematic view of a user equipment according to an embodiment of the present invention.

FIG. 1A shows a schematic view of a user equipment 100 according to an embodiment of the present invention. In one example embodiment, the user device 100 is a smartphone, smartwatch or a tablet computer. The user equipment 100 comprises a controller 101, a memory 102 and a user interface 104 (comprising one or more interface components 104-1-104-4 as will be discussed in detail below).

It should be noted that the user equipment 100 may comprise a single device or may be distributed across several devices and apparatuses.

The controller 101 is configured to control the overall operation of the user equipment 100. In one embodiment, the controller 101 is a specific purpose controller. In one embodiment, the controller 101 is a general purpose controller. In one embodiment, the controller 101 is a combination of one or more of a specific purpose controller and/or a general purpose controller. As a skilled person would understand there are many alternatives for how to implement a controller, such as using Field Programmable Gate Arrays circuits, ASIC, CPU, GPU, NPU etc. in addition or as an alternative. For the purpose of this application, all such possibilities and alternatives will be referred to simply as the controller 101.

The memory 102 is configured to store data such as application data, settings and computer-readable instructions that when loaded into the controller 101 indicates how the user equipment 100 is to be controlled. The memory 102 may comprise several memory units or devices, but they will be perceived as being part of the same overall memory 102. There may be one memory unit for a display arrangement storing instructions and application data, one memory unit for a display arrangement storing graphics data, one memory for the communication interface 103 for storing settings, and so on. As a skilled person would understand there are many possibilities of how to select where data should be stored and a general memory 102 for the user equipment 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

In one embodiment the user equipment 100 may further comprise a communication interface 103. The communication interface 103 may be wired and/or wireless. The communication interface 103 may comprise several interfaces.

In one embodiment the communication interface 103 comprises a USB (Universal Serial Bus) interface. In one embodiment the communication interface 103 comprises a HDMI (High Definition Multimedia Interface) interface. In one embodiment the communication interface 103 comprises a Display Port interface. In one embodiment the communication interface 103 comprises an Ethernet interface. In one embodiment the communication interface 103 comprises a MIPI (Mobile Industry Processor Interface) interface. In one embodiment the communication interface comprises an analog interface, a CAN (Controller Area Network) bus interface, an I2C (Inter-Integrated Circuit) interface, or other interfaces.

In one embodiment the communication interface 103 comprises a radio frequency (RF) communications interface. In one such embodiment the communication interface 103 comprises a Bluetooth™ interface, a WiFi™ interface, a ZigBee™ interface, a Z-Wave™ interface, a RFID™ (Radio Frequency IDentifier) interface, Wireless Display (WiDi) interface, Miracast interface, and/or other RF interface commonly used for short range RF communication. In an alternative or supplemental such embodiment the communication interface 103 comprises a cellular communications interface such as a fifth generation (5G) cellular communication interface, an LTE (Long Term Evolution) interface, a GSM (Global Systeme Mobile) interface and/or other interface commonly used for cellular communication. In one embodiment the communication interface 103 is configured to communicate using the UPnP (Universal Plug n Play) protocol. In one embodiment the communication interface 103 is configured to communicate using the DLNA (Digital Living Network Appliance) protocol.

In one embodiment, the communication interface 103 is configured to enable communication through more than one of the example technologies given above. The communication interface 103 may be configured to enable the user equipment 100 to communicate with other devices, such as other smartphones.

The user interface 104 comprises one or more interface components 104-1-104-4 such as one or more output devices and one or more input devices. Examples of output devices are a display arrangement, such as a display 104-1, one or more lights (not shown in FIG. 1A) and a speaker (not shown). Examples of input devices are one or more buttons 104-2, a camera (not shown) and a microphone (not shown). In one embodiment, the display arrangement comprises a touch display 104-1 that act both as an output and as an input device being able to both present graphic data and receive input through touch, for example through virtual buttons.

The user interface 104 of a user equipment 100 according to the teachings herein further comprises one or more side sensors 104-3 that are configured to detect and determine the presence of and distance to an object remotely, without contact being made. Such side sensors 104-3 enable for an extended user interface area 104-4 where touchless input may be provided. In the example of FIG. 1A there are two side sensors 104-3A and 104-3B arranged in the user equipment, one on either side of the display 104-1.

Figure 1B:
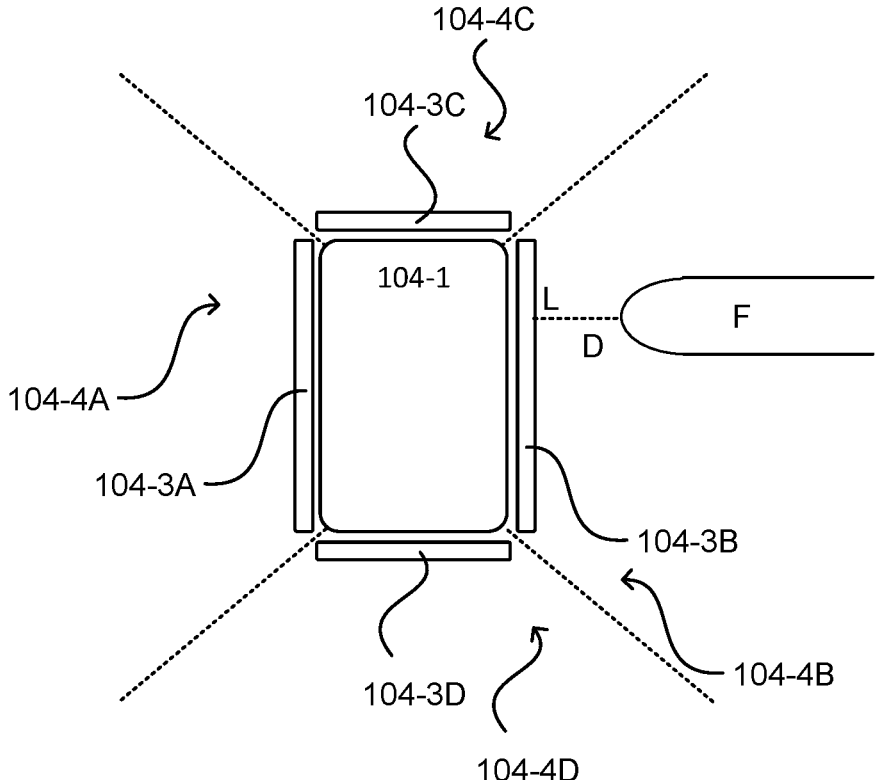
FIG. 1B shows a schematic view of a subsection of a user equipment according to an embodiment of the present invention.

FIG. 1B shows a schematic view of components of a user equipment 100 such as the user equipment 100 of FIG. 1A, however in the example of FIG. 1B there are four side sensors 104-3A-D arranged, one on each side of the display 104-1, thereby providing an extended user interface 104-4 having four subsections 104-4A-D. Even if the example given in FIG. 1B is focused on 4 side sensors and 4 subsections, there can be variations with a different number of side sensors 103, as well as a different number of subsections.

It should be noted that a side sensor 104-3 may comprise one sensor or an array of sensors depending on the technology being used for implementing such a side sensor. Examples of technologies for implementing such side sensors are: radar sensors, light-based proximity sensors, capacitive-based proximity sensors to mention a few examples.

Utilizing such a side sensor 104-4, the user equipment 100 according to the teachings herein is enabled to determine that an object, such as a user's finger F, is at a distance D from a location L relative the display 104-1 as shown in FIG. 1B.

For the purpose of the teachings herein, all sensors will be treated as one sensor 104-3 providing an extended user interface area for touchless input, hereafter referred to as a touchless input area 104-4.

In an embodiment where the display 104-1 is a touch screen, the combination of a touch screen 104-1 and the side sensor 104-3 thus provides for a combined interface area having one portion for touch input (the touch display 104-1) and one portion for touchless input (the touchless input area 104-4).

In one embodiment the touchless input area 104-4 is assigned to applications or processes that are executing as background applications. As is known a user equipment is able to execute an application in an active mode or in a background mode. An application being executed in an active mode, is assigned at least a portion of the display for providing graphical output and most of the buttons 104-2 of the user equipment, including any virtual buttons being displayed on the display 104-1 if the display 104-1 is a touch screen. An application being executed in a background mode, however, is not assigned more than a fraction of the display space and normally no controls at all. Controlling such a background application thus often requires that the background application is activated and made into an active—or top-application, whereby any other application being executed as an active (top) application will have to be paused, as has been discussed above in the background section.

However, the user equipment 100 according to the present teachings is configured to receive input regarding background applications through the touchless input area 104-4. As stated above, the side sensor 104-3 is able to determine the distance D to an object F. It is thus possible to determine an activation of a command, such as a (touchless) press by determining that the distance D to an object falls under a threshold distance. Furthermore, also as stated above, the side sensor 104-3 is able to determine the Location L of an object F relative the side sensor. It is thus possible to assign different commands or controls to different locations along the display 104-1. In this manner, the user interface 104 is expanded and allows for providing more user controls without obscuring or interfering with the display space assigned to an active application.

FIG. 1C shows the user equipment 100 of FIG. 1A, where different commands have been assigned to different portions of the touchless input area 104-4. In this example there are three commands C1-C3 that are assigned to each a portion P1-P3 of the touchless input area 104-4. By the user equipment 100 determining within which portion P1-P3 the object being detected as being at a distance falling under the threshold distance, it is possible to determine which command C1-C3 to execute. In one embodiment the different commands C1-C3 relate to the same application. In one embodiment there is at least one command associated with a first application and at least one command associated with a second application. In one such embodiment, where there is a first and a second application, the first application is associated with a first portion of the touchless input area 104-4 and the second application is associated with a second portion of the touchless input area 104-4, wherein the commands associated with each application is assigned to a sub-portion of the portion of the corresponding application. For example, in the example of FIG. 1C, the first application is assigned portions P1 and P2, and the commands C1 and C2 are associated with the first application and the second application is assigned portion P3 and the command C3 is associated with the second application.

It should be noted that the size of the portions as well as location and/or distribution of portions need not be equal or regular, and any distribution is possible.

In order to provide an intuitive and easy to remember user interface that is simple to use, the user equipment 100 according to the teachings herein is configured to enable a user to setup the touchless input area 104-4.

FIG. 2A shows a schematic view of a user equipment 100 as in FIG. 1A, where application content 110 is displayed on the display 104-1. The application content 110 may comprise one or more graphical representations, such as application icons, functional control icons and/or images to be presented. In the example of FIG. 2A there is one icon displayed and graphical data relating to a car driving game.

As indicated, the touchless input area 104-4 is arranged to have at least one portion P1, which may be arranged in one or more sub-portions P1.1, P1.2. For the context of the teachings herein, no difference will be made between the touchless input area 104-4, a portions P1 of the touchless input area, and sub portions P1.1, P1.2 of such portions, unless specifically specified.

As discussed in relation to FIGS. 1A, 1B and 1C the side sensor 104-3 is enabled to detect an object (such as a user's finger) F and the location L and distance D to the display of the object.

In order to provide an extended user interface that does not interfere with the ongoing execution and/or presentation of a currently executed application, i.e. the top application, the inventors have realized and devised a highly intuitive menu interactions system which allows for providing many, almost endless, options of controls while not interfering with the top application. Such menu interaction system is highly useful for executing and/or controlling background application and/or for providing system controls for the user equipment 100, general controls or specific controls.

Some examples are if a user wishes to control volume settings or other controls for a music player application running in the background while playing a car driving game, to handle an incoming call without interrupting the car driving game, quick replies to messages, and/or controlling connected devices (such as media devices (TV), or other smart home devices).

The menu system may also be utilized to execute, and eventually initiate, another top application without interfering with the current top application by treating the second top application as a background application.

Some examples are if a user wishes to select a specific music file to be played (i.e. to look through the music library other than by skipping to next song) for a music player application running in the background while playing a car driving game, to set up and handle an outgoing call to a specific contact without interrupting the car driving game, and/or to switch connection settings without interrupting the car driving game or other application being executed.

In order to accomplish this, the user equipment is configured to detect that an object, such as a user's finger, F is within the touchless input area 104-4 by the controller 101 receiving data indicating this from the side sensor 104-3. The controller 101 also determines which portion the object F is within of the touchless input area 104-4. In one embodiment, the controller is configured to determine that the object is within the touchless input area 104-4 by determining that the distance D1 is below an initial threshold distance.

As the object has been detected, the controller 101 is, in one embodiment, configured to indicate at least one menu option associated with the portion that object F is within. In one embodiment, the controller is also configured to indicate that the portion is associated with a menu or array of commands, by indicating the corresponding portion on the display 104-1. In FIG. 2B, showing a schematic view of the user equipment 100 of FIG. 2A, this is indicated by feedback 120. The feedback may be visual (graphic and/or lights) and/or audio. In FIG. 2B the feedback 120 indicates that the portion P1 is associated with a menu, and also indicates the extent of the menu.

Regardless of the feedback, the controller 101 is configured to indicate at least one menu option associated with the portion that object F is within. In this context, a menu option may be a control command, a menu traversal command (up/back/next, . . . ), a further menu option and/or an application. Hereafter they will all be referred to as options. FIG. 2C shows a schematic view of the user equipment 100 of FIG. 2A and FIG. 2B, where three options are displayed.

In one embodiment, the options O1-O3 are only displayed once it is determined that the object F is moved closer to the display 104-1. In one context, "closer" refers to a distance shorter than the distance at which the object was when the feedback 120 was displayed. In one context, "closer" refers to a distance falling below a first threshold distance. It should be noted that the two contexts may be combined, perhaps where the distance of the first context (the distance at which the object was when the feedback 120 was displayed) defines the threshold distance. With reference to FIGS. 2B and 2C, distance D1 is larger than distance D2. Or in other words, D2 falls under a first threshold distance, whereas D1 does not.

The options are preferably displayed in a manner where they are substantially transparent so that they do not obscure the content being displayed at the same position on the display 104-1. They are also displayed as being transparent, by the controller treating any input received in a display area overlapped by the graphical representation of an option O1-O3 (or O4-O6) as being an input for the underlying content, i.e. for the current top application. In FIG. 2C this is indicated by the dotted lines and the fact that one can still see the underlying content being displayed. The same applies to the feedback 120.

It should be noted that the options O1-O3 may not need be displayed and the displaying of such options could be a user setting, and a user could simply learn by heart where an option is located without needing to see the option being displayed.

It should also be noted that the options may be presented, alternatively or additionally through audio output providing indication(s) of the option(s).

In one embodiment, the option is simply displayed as an indication for guiding the user to the location of the option, which is useful in situations where the user has memorized the order of the options but perhaps not the exact locations.

As can be seen in FIG. 2C, each option may be associated with a sub-portion (as indicated by the dotted lines indicating a division of the portion P1). In FIG. 2C references for the sub-portions have been omitted in order to not clutter FIG. 2C.

In one embodiment, the controller 101 is further configured to indicate which option O1-O3 would be selected currently if a selection was made, i.e which option is the user currently deemed to hover over. In FIG. 2C this is indicated by option O1 being highlighted. The marking can be through highlighting an option, change the size of the option, change the color of the option, change the symbol of the option and/or any combination thereof. The controller is further configured to determine that the object F is moved in a direction parallel to the display 104-1 (i.e. up or down in the plane of the display), and in response thereto, indicate another option being currently selectable. FIG. 2D shows a schematic view of the user equipment 100 of FIG. 2C, where the user has moved its hand down and the second option O2 is now indicated as selectable.

The controller 101 is further configured to determine that the object F is moved closer to the display 104-1, thereby receiving a selection of the option at the location of the object O2, and in response thereto execute an action associated with the option currently being selectable.

The associated action depends on what type the option is. For example, the action for an option being a menu traversal option would be to execute the menu traversal (up/down/ . . . ), the action for an option being a command would be to execute the command, the action for an option corresponding to a deeper menu level would be to open the deeper or further menu level, thereby displaying at least one further option. The further option(s) may display in addition to the previous options, and/or instead of the previous options.

Figures 2E, 2F, 2G, 2H, 2I:
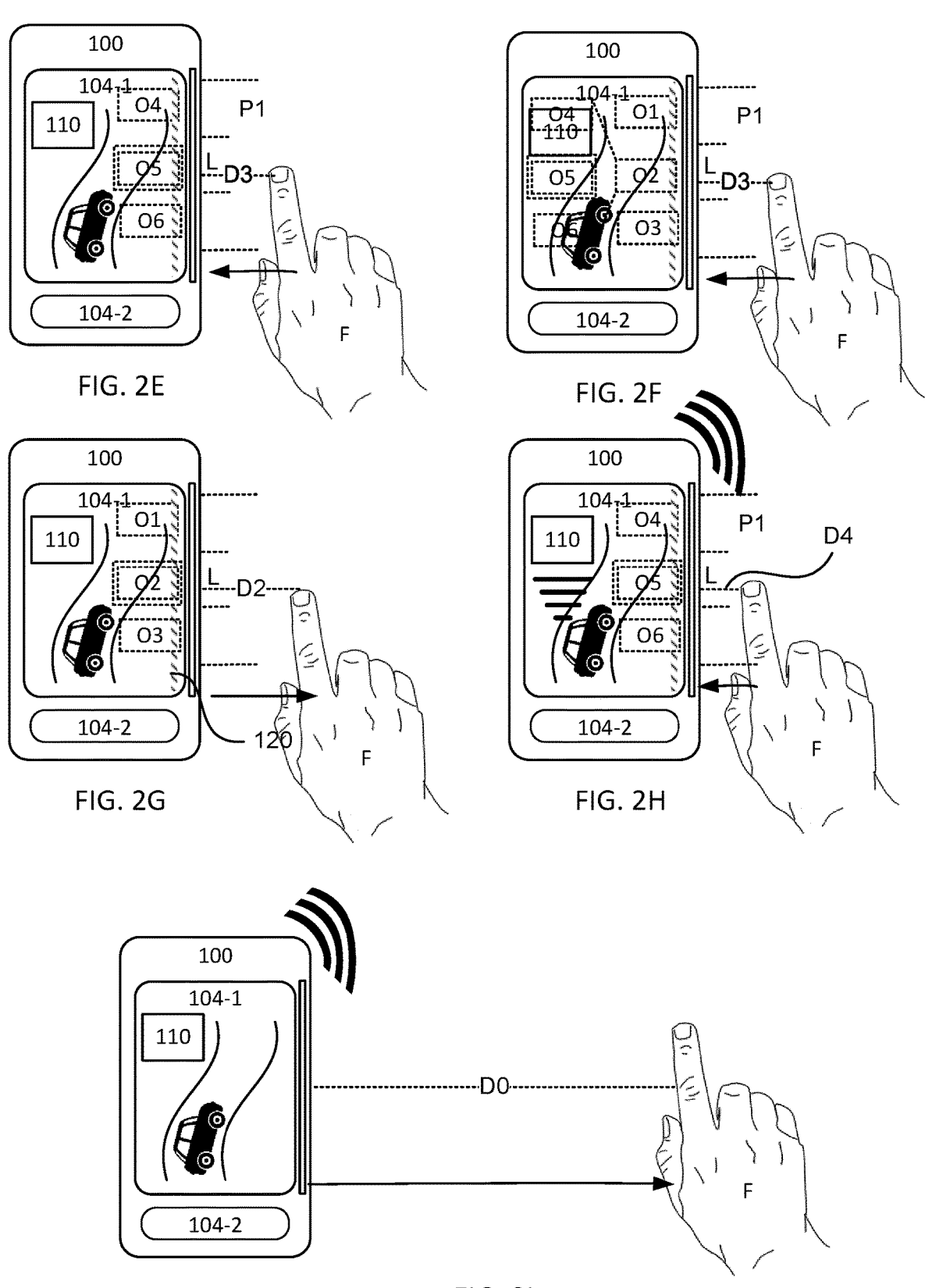
FIG. 2E shows a schematic view of a user equipment according to an embodiment of the present invention.
FIG. 2F shows a schematic view of a user equipment according to an embodiment of the present invention.
FIG. 2G shows a schematic view of a user equipment according to an embodiment of the present invention.
FIG. 2H shows a schematic view of a user equipment according to an embodiment of the present invention.
FIG. 2I shows a schematic view of a user equipment according to an embodiment of the present invention.

FIGS. 2E and 2F each shows a schematic view of the user equipment of FIGS. 2C and/or 2D where further options are displayed. With reference to FIG. 2C, the distance D3 is smaller than the distance D2. Or in other words, D3 falls under a second threshold distance, whereas D2 does not. FIG. 2E shows where the further options O4-O6 are displayed instead of the previous options O1-O3. FIG. 2F shows where the further options O4-O6 are displayed in addition to the previous options O1-O3. As can be seen in FIG. 2F, the currently selectable option (option O5) may be highlighted. As can also be seen, the controller 101 may be configured to display indications of which option (O2) the further options (O4-O6) relate to.

The controller 101 may also be configured to determine that the object is moved away from the display and in response thereto return to a higher menu level.

FIG. 2G shows a schematic view of the user equipment of FIG. 2C or 2D where the user's hand has been moved away from the display (such as back to distance D2), and the further options O4-O6 are no longer displayed.

This thus allows for traversal of a menu structure of options, without interfering substantially with an executing top application.

FIG. 2H shows a schematic view of the user equipment of FIGS. 2C, 2D, 2E and/or 2F where the controller has detected that the object has moved closer to the display, and in response thereto execute the action associated with the selected option (in case of FIGS. 2C and 2D, the option O2, and in case of FIGS. 2E and 2F, the option O5) and where the action is to execute a command. In this example the command is to increase the volume settings for the user equipment, as is indicated in FIG. 2H with visual feedback, in this example using commonly used graphics. With reference to FIGS. 2E, 2F and 2H, the distance D4 is smaller than the distance D3. Or in other words, D4 falls under a third threshold distance, whereas D3 does not. With reference to FIGS. 2C, 2D and 2H, the distance D4 is substantially the distance D3, i.e. they fall within the same threshold range.

In the example given herein, the volume is increased by pushing a virtual touchless button. However, other variants exist for such increase/decrease commands. One example being to select a function option (by moving towards the display), and then move the finger up to increase and down to decrease the associated function. Examples of functions can be related to volume, brightness, scrolling, toggle on/off switches, and adjust settings to mention a few examples.

As an action has been performed, the controller may be configured to continue display the currently displayed options, even when it is detected that the finger is moved away slightly (to a next distance interval) from the display. This allows for further selections of options. Alternatively or additionally, the controller is configured to stop displaying all options. The controller 101 is also configured to stop displaying all options if it is determined that the object is moved away from the display. FIG. 2I shows the user equipment of any of FIGS. 2A-2H, where the object is moved away from the display 104-1. As can be seen, no more options are displayed. However, the effect of any commands having been executed is still applicable, as indicated by the raised volume continuing on the example given with regards to FIG. 2H.

In one embodiment the controller 101 is configured to determine that the object F is moved away from the display when the object is at a distance falling above the initial threshold distance, i.e. at a distance DO. With reference to FIG. 2A and FIG. 2I, the distance D1 is shorter than the distance DO. Or in other words, distance D1 falls below the initial threshold distance, whereas DO does not. In one embodiment the distance DO is substantially the distance D1, i.e. falling within the same threshold range.

In one embodiment the controller 101 is configured to determine that the object is moved away from the display when the object F is no longer detectable.

In one embodiment the controller 101 is further arranged to track an object F in order to ensure that a command is only activated when the object is coming close to the display 104-1. This safeguards against accidental activation of an action/command simply by the user changing a grip or another object coming into close proximity. Such a situation could easily occur when manipulating a user equipment 100 while seated in a moving vehicle, such as a train carriage or a bus.

A threshold range is seen as the range between and possibly including thresholds relevant to the distance(s) in question.

Figure 3:
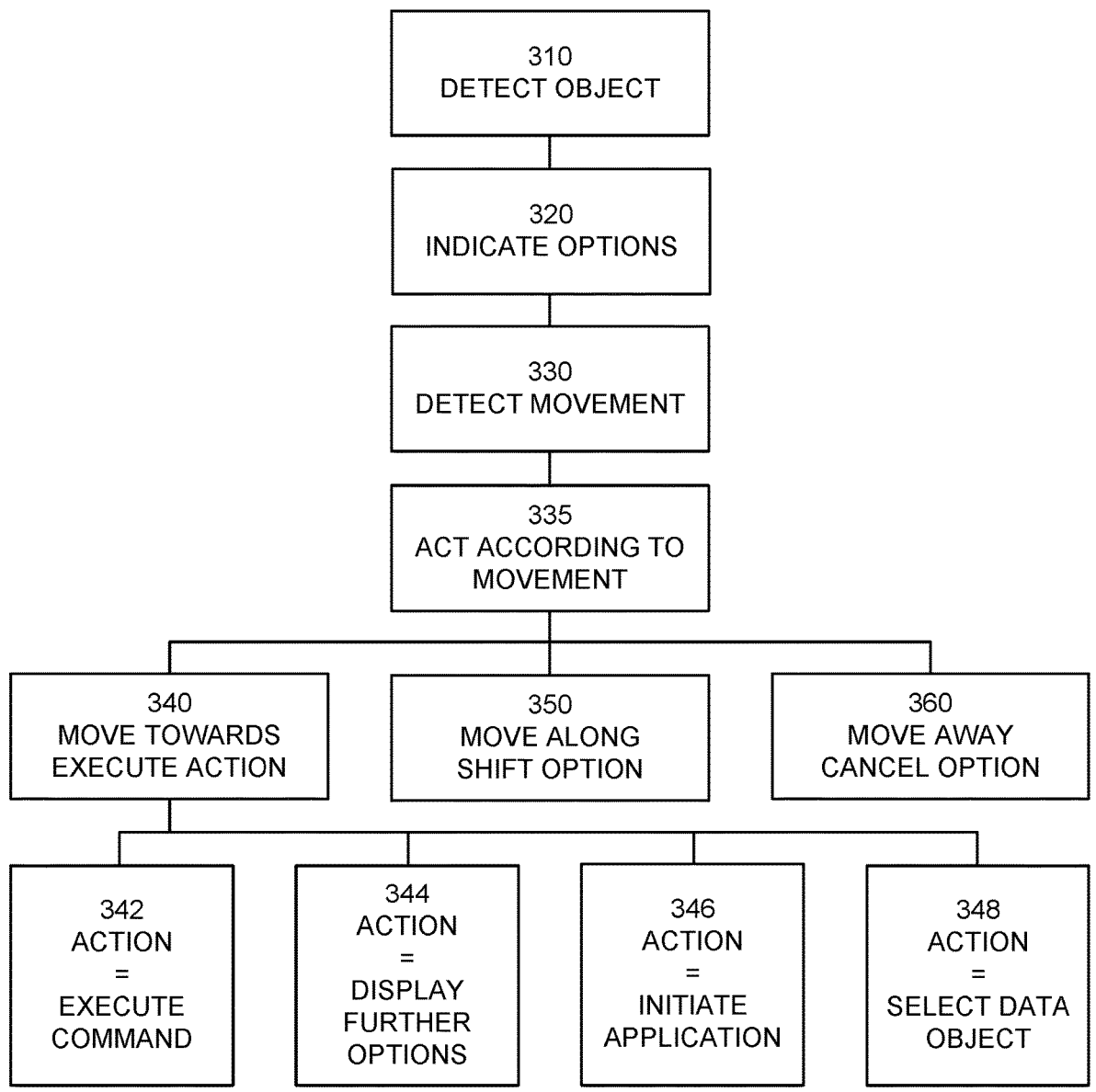
FIG. 3 shows a flowchart of a general method according to an embodiment of the present invention.

It should be noted that even though the figures herein are displaying three options (at a time) it should be noted that any number of options to display is possible and depends on the number of options available, the size of the portion P1/P1.1, the size of the display 104-1 and the size of the indications FIG. 3 shows a flowchart for a general method according to herein. The controller 101 detects 310 that an object is in the touchless input area 104-4 by determining that the object F is at a distance D1 falling below a threshold distance, which threshold distance could be the (reliable) range of the side sensor(s) 104-3. In one embodiment, the controller 101 is further configured to determine that the detected object is a finger of a user. In one alternative or additional embodiment, the controller 101 is further configured to determine that the object F is of an extent that is smaller than the extent of a portion P1 of the touchless input area 104-4 that the object is within.

As the object F is detected the controller is configured to indicate 320 that at least one option is available for selection. This may be done by indicating the extent of a menu structure and/or by displaying at least one option O1-O3, or rather display graphical representations for the at least one option.

An option being at a location corresponding to the object (such as corresponding to the location of a tip of a finger) is considered as a selectable option. In one embodiment, the controller 101 is configured to indicate which option that is currently selectable.

The controller 101 is further configured to detect 330 a movement of the object F and act 335 accordingly.

When the movement is detected to be towards the user equipment 100, such as when the distance to the object falls below a threshold value, the controller 101 is configured to act by performing 340 an action associated with the currently selectable option, i.e. the option being displayed at a location corresponding to where the distance to the object falls below the threshold distance.

When the option is associated with a command, the controller is configured to execute 342 such a command. In one embodiment the controller is further configured to receive further input regarding the command and then executing based on the further input (such as moving up to increase, down to decrease as discussed above).

When the option is associated with further options, such as for displaying further options in a menu structure, the controller is configured to display 344 the further options.

When the option is associated with an application to be initiated, the controller is configured to initiate 346 the application.

When the option is associated with a data object, the controller is configured to select 348 the data object and possibly execute an associated command. One example of a data object is a contact, and an associated action could be to initiate a communication with the contact.

This allows for providing a manner of traversing a menu structure and/or a complete user interface structure, where further options may be displayed, commands and functions may be executed, applications may be initiated and data objects may be selected.

When the movement is detected to be along or parallel to the user equipment 100, the controller 101 is configured to determine 350 a new selectable option corresponding to a new location of the object.

When the movement is detected to be away from the user equipment 100, the controller 101 is configured to stop 360 displaying the at least one option, i.e. to cancel the at least one option.

Other variants and alternatives area also possible for the various functions as discussed in the above. Some of these alternatives will be discussed below, and it should be noted that they may all, some or each be combined with the embodiments discussed in the above as suitable and compatible.

Figure 4:
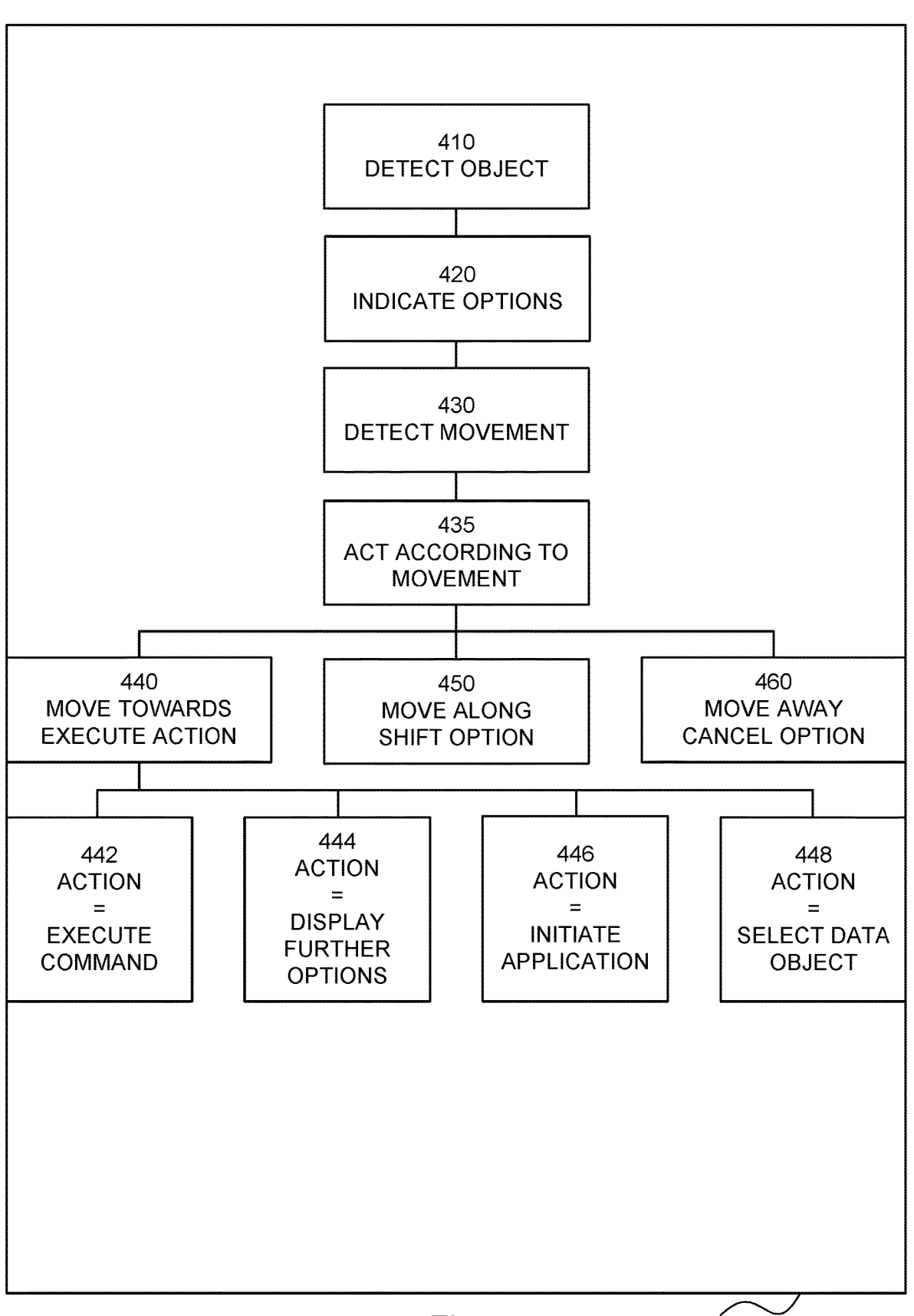
FIG. 4 shows a component view for a software module arrangement according to an embodiment of the teachings herein.

FIG. 4 shows a component view for a software module (or component) arrangement 400 according to an embodiment of the teachings herein. The software module arrangement 400 is adapted to be used in a user equipment 100 as taught herein and for enabling the user equipment 100 to execute a method according to FIG. 3. The software module arrangement 400 comprises a software module for detecting 410 that an object F is in the touchless input area 104-4 and a software module for indicating 420 at least one option. The software module arrangement 400 comprises a software module for detecting 430 a movement of the object F and a software module for acting 435 accordingly, wherein when the movement is detected to be towards the user equipment 100, act accordingly by performing 440 an action associated with the option being displayed at a location corresponding to the object; and when the movement is detected to be along the user equipment 100, act accordingly by determining 450 a new option corresponding to a new location of the object F; when the movement is detected to be away from the user equipment 100, cancelling 460 at least one option.

Figure 5:
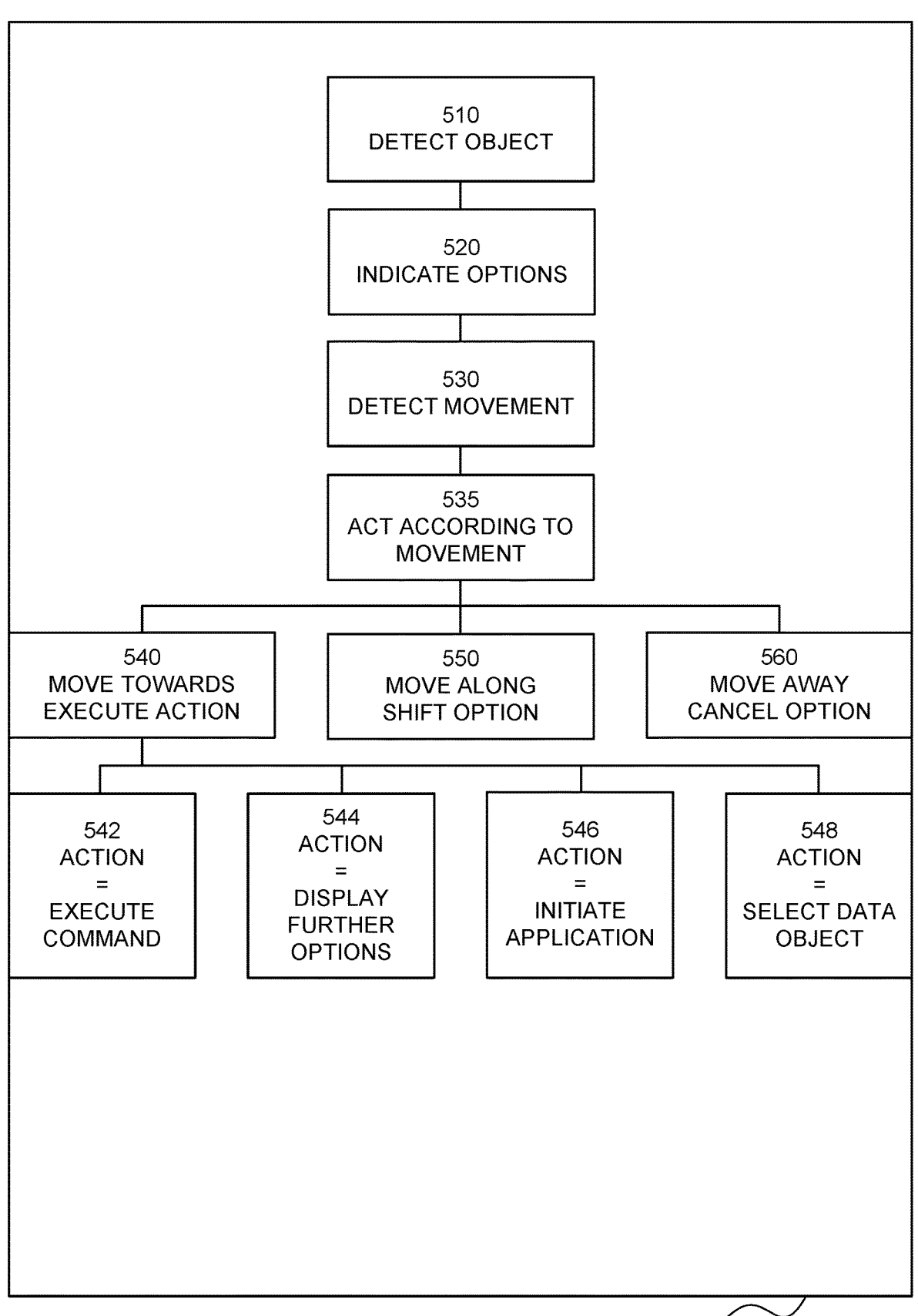
FIG. 5 shows a component view for an arrangement comprising circuits according to an embodiment of the teachings herein.

FIG. 5 shows a component view for an arrangement 500 comprising circuitry. The arrangement comprising circuitry is adapted to be used in a user equipment 100 as taught herein and for enabling the user equipment 100 to execute a method according to FIG. 3. The arrangement 500 comprises circuitry for detecting 510 that an object F is in the touchless input area 104-4 and circuitry for indicating 520 at least one option. The arrangement 500 also comprises circuitry for detecting 530 a movement of the object F and circuitry for acting 535 accordingly, wherein when the movement is detected to be towards the user equipment 100, act accordingly by performing 540 an action associated with the option being displayed at a location corresponding to the object; when the movement is detected to be along the user equipment 100, act accordingly by determining 550 a new option corresponding to a new location of the object F; when the movement is detected to be away from the user equipment 100, cancelling 560 at least one option.

Figure 6:
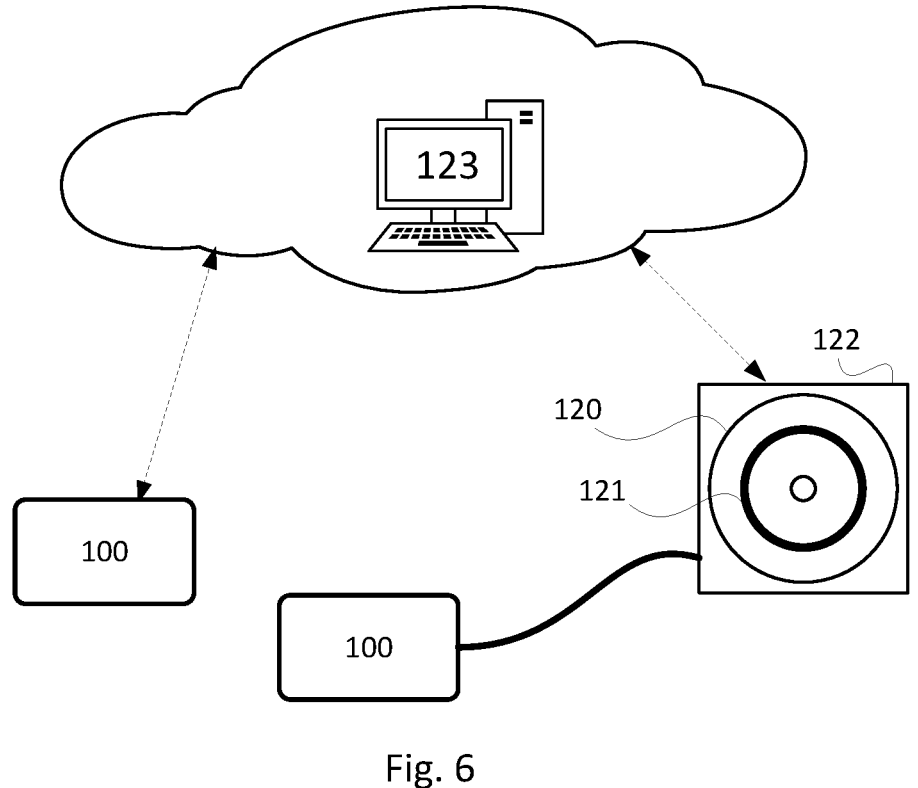
FIG. 6 shows a schematic view of a computer-readable medium carrying computer instructions that when loaded into and executed by a controller of an arrangement enables the arrangement to implement an embodiment of the present invention.

FIG. 6 shows a schematic view of a computer-readable medium 120 carrying computer instructions 121 that when loaded into and executed by a controller of a user equipment 100 enables the user equipment 100 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 6, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the user equipment 100 for being executed by the controller 101.

The computer disc reader 122 may also or alternatively be connected to (or possibly inserted into) a user equipment 100 for transferring the computer-readable computer instructions 121 to a controller of the user equipment 100 (presumably via a memory of the user equipment 100).

FIG. 6 shows both the situation when a user equipment 100 receives the computer-readable computer instructions 121 via a server connection and the situation when another user equipment 100 receives the computer-readable computer instructions 121 through a wired interface. This enables for computer-readable computer instructions 121 being downloaded into a user equipment 100 thereby enabling the user equipment 100 to operate according to and implement the invention as disclosed herein.

The invention claimed is:

1. A user equipment comprising a display, at least one side sensor and a controller, wherein the side sensor configured to receive touchless user input at a side of the display, thereby providing a touchless input area, and wherein the controller is configured to:

detect that an object is in the touchless input area;

indicate at least one option;

detect a movement of the object; and act by:

when the movement is detected to be towards the user equipment, the controller is configured to act by performing an action associated with the option being displayed at a location corresponding to the object;

when the movement is detected to be along the user equipment, the controller is configured to act accordingly by determining a new option corresponding to a new location of the object; and when the movement is detected to be away from the user equipment to a distance interval from the display and the option is associated with displaying further options, the controller is configured to stop displaying the further options.

2. The user equipment according to claim 1, wherein when the option is associated with a command the controller is further configured to perform the associated action by executing such command.

3. The user equipment according to claim 2, wherein the controller is further configured to receive further input regarding the command and then executing based on the further input.

4. The user equipment according to claim 1, wherein when the option is associated with further options, the controller is further configured to perform the associated action by displaying the further options.

5. The user equipment according to claim 1, wherein when the option is associated with an application to be initiated, the controller is further configured to perform the associated action by initiating the application.

6. The user equipment according to claim 1, wherein when the option is associated with a data object, the controller is further configured to perform the associated action by selecting the data object.

7. The user equipment according to claim 6, wherein the data object is associated with command, and the controller is further configured to perform the associated action by executing the command associated with the data object.

8. The user equipment according to claim 1, wherein the controller is further configured to detect that an object is in the touchless input area by determining that the object is at a distance falling below a threshold distance.

9. The user equipment according to claim 8, wherein the threshold distance is the range of the side sensor.

10. The user equipment according to claim 1, wherein the controller is further configured to determine that the detected object is a finger of a user.

11. The user equipment according to claim 1, wherein the controller is further configured to indicate that the at least one option is available for selection by indicating the extent of a menu structure.

12. The user equipment according to claim 1, wherein the controller is further configured to indicate that the at least one option is available for selection by displaying at least one option.

13. The user equipment according to claim 1, wherein the controller is further configured to determine an option as being a selectable option if the option is displayed at a location corresponding to where the distance to the object falls below the threshold distance.

14. The user equipment according to claim 1, wherein the controller is further configured to indicate the selectable option.

15. The user equipment according to claim 1, wherein the controller is further configured to detect that a movement is towards the user equipment when the distance to the object falls below a threshold value.

16. The user equipment according to claim 4, wherein the further options are further options in a menu structure.

17. The user equipment according to claim 4, wherein the controller is further configured to configured to display the further options in addition to the options.

18. The user equipment according to claim 4, wherein the controller is further configured to display the further options instead of the options.

19. The user equipment according to claim 1, wherein the user equipment is a smartphone, smart watch or a tablet computer.

20. A method for use in a user equipment comprising a display and at least one side sensor configured to receive touchless user input at a side of the display, thereby providing a touchless input area, and
wherein the method comprises:
  detecting that an object is in the touchless input area;
  indicating at least one option;
  detecting a movement of the object and
  acting by:
    when the movement is detected to be towards the user equipment, act accordingly by performing an action associated with the option being displayed at a location corresponding to the object;
    when the movement is detected to be along the user equipment, act accordingly by determining a new option corresponding to a new location of the object;

when the movement is detected to be away from the user equipment to a distance interval from the display, cancelling at least one option.

21. A non-transitory computer-readable medium carrying computer instructions that when loaded into and executed by a controller of a user equipment enables the user equipment to implement a method for use in the user equipment, wherein the user equipment comprises a display and at least one side sensor configured to receive touchless user input at a side of the display, thereby providing a touchless input area, and wherein the method comprises:
  detecting that an object is in the touchless input area;
  indicating at least one option;
  detecting a movement of the object; and
  acting by:
    when the movement is detected to be towards the user equipment, act accordingly by performing an action associated with the option being displayed at a location corresponding to the object;
    when the movement is detected to be along the user equipment, act accordingly by determining a new option corresponding to a new location of the object;
    when the movement is detected to be away from the user equipment to a distance interval from the display and the option is associated with displaying further options, stopping the displaying of the further options.

22. An arrangement adapted to be used in a user equipment comprising a display, at least one side sensor configured to receive touchless user input at a side of the display, thereby providing a touchless input area, and said arrangement comprising:
  circuitry for detecting that an object is in the touchless input area;
  circuitry for indicating at least one option;
  circuitry for detecting a movement of the object; and
  circuitry for acting by:
    when the movement is detected to be towards the user equipment, act accordingly by performing an action associated with the option being displayed at a location corresponding to the object;
    when the movement is detected to be along the user equipment, act accordingly by determining a new option corresponding to a new location of the object;
    when the movement is detected to be away from the user equipment to a distance interval from the display and the option is associated with displaying further options, stopping the displaying of the further options.

* * * * *